(12) United States Patent
Okubo et al.

(10) Patent No.: US 8,780,472 B2
(45) Date of Patent: Jul. 15, 2014

(54) INFORMATION REPRODUCING APPARATUS AND INFORMATION REPRODUCING METHOD FOR CANCELLING INTERFERENCE BETWEEN ADJACENT TRACKS

(71) Applicant: Kabushiki Kaisha Toshiba, Tokyo (JP)

(72) Inventors: Tomokazu Okubo, Musashimurayama (JP); Akihiro Yamazaki, Yokohama (JP); Kazuto Kashiwagi, Ome (JP); Naoki Tagami, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/623,748

(22) Filed: Sep. 20, 2012

(65) Prior Publication Data

US 2013/0215528 A1      Aug. 22, 2013

(30) Foreign Application Priority Data

Feb. 17, 2012   (JP) .................................. 2012-033314

(51) Int. Cl.
*G11B 5/09*       (2006.01)
(52) U.S. Cl.
USPC .......................................................... 360/45
(58) Field of Classification Search
None
See application file for complete search history.

(56) References Cited

U.S. PATENT DOCUMENTS 5,729,514 A *   3/1998  Horigome et al. ......... 369/47.17
2008/0192378 A1*  8/2008  Bliss et al. ...................... 360/69

FOREIGN PATENT DOCUMENTS

| JP | 07-334931   | 12/1995 |
| JP | 2728094     | 3/1998  |
| JP | 2000-113595 | 4/2000  |

* cited by examiner

*Primary Examiner* — Daniell L Negron
(74) *Attorney, Agent, or Firm* — Patterson & Sheridan

(57) ABSTRACT

According to one embodiment, an information reproducing apparatus is configured to obtain, from a read sample value sequence obtained by sampling a read signal read from a first recording track of a magnetic recording medium, an interference-component-removed read sample value sequence, from which an interference component from a second recording track adjacent to the first recording track is removed. The apparatus includes a decoding module. The decoding module is configured to generate a first interference-component-removed read sample value sequence based on a cancellation weight column which varies according to a difference in polarity between a first bit of the first recording track and a second bit of the second recording track adjacent to the first bit.

9 Claims, 11 Drawing Sheets

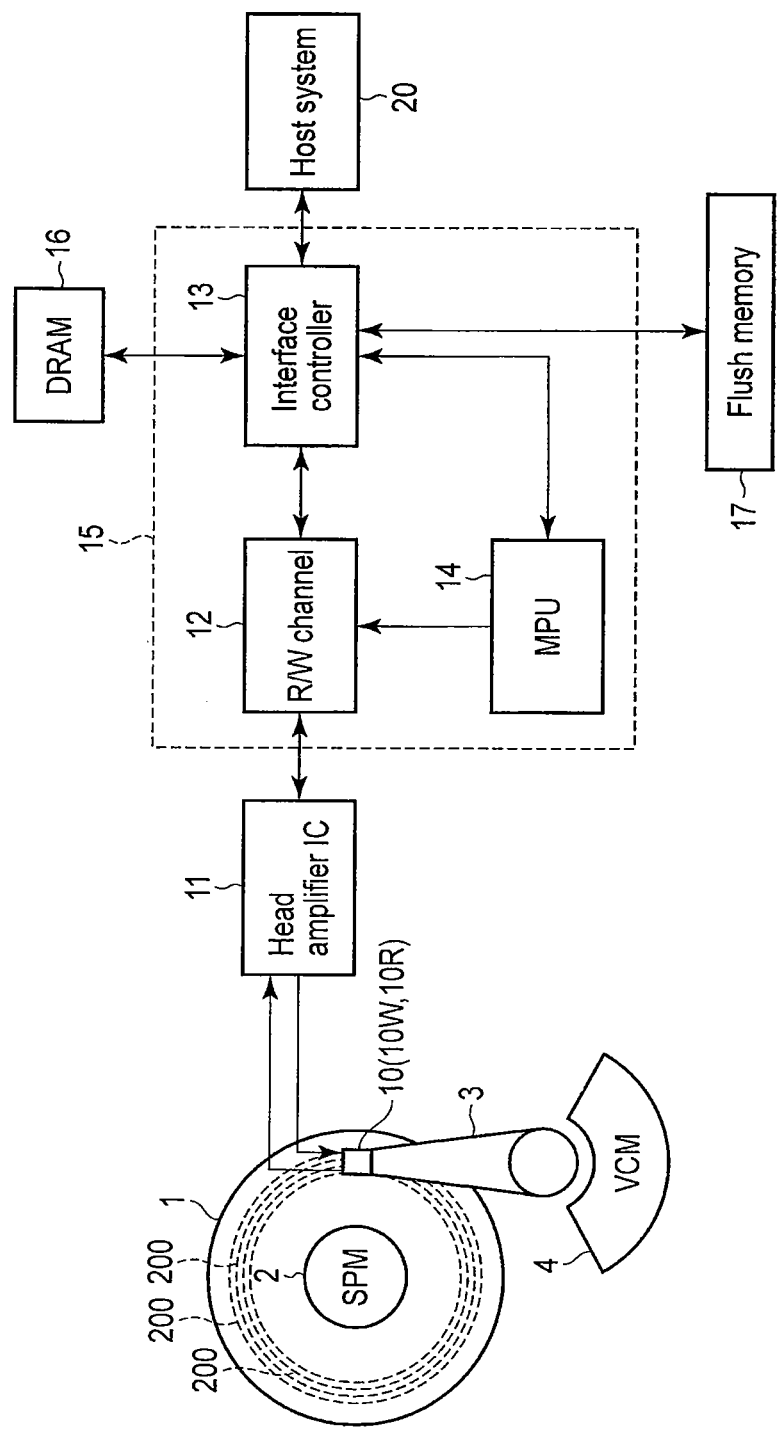
F I G. 1

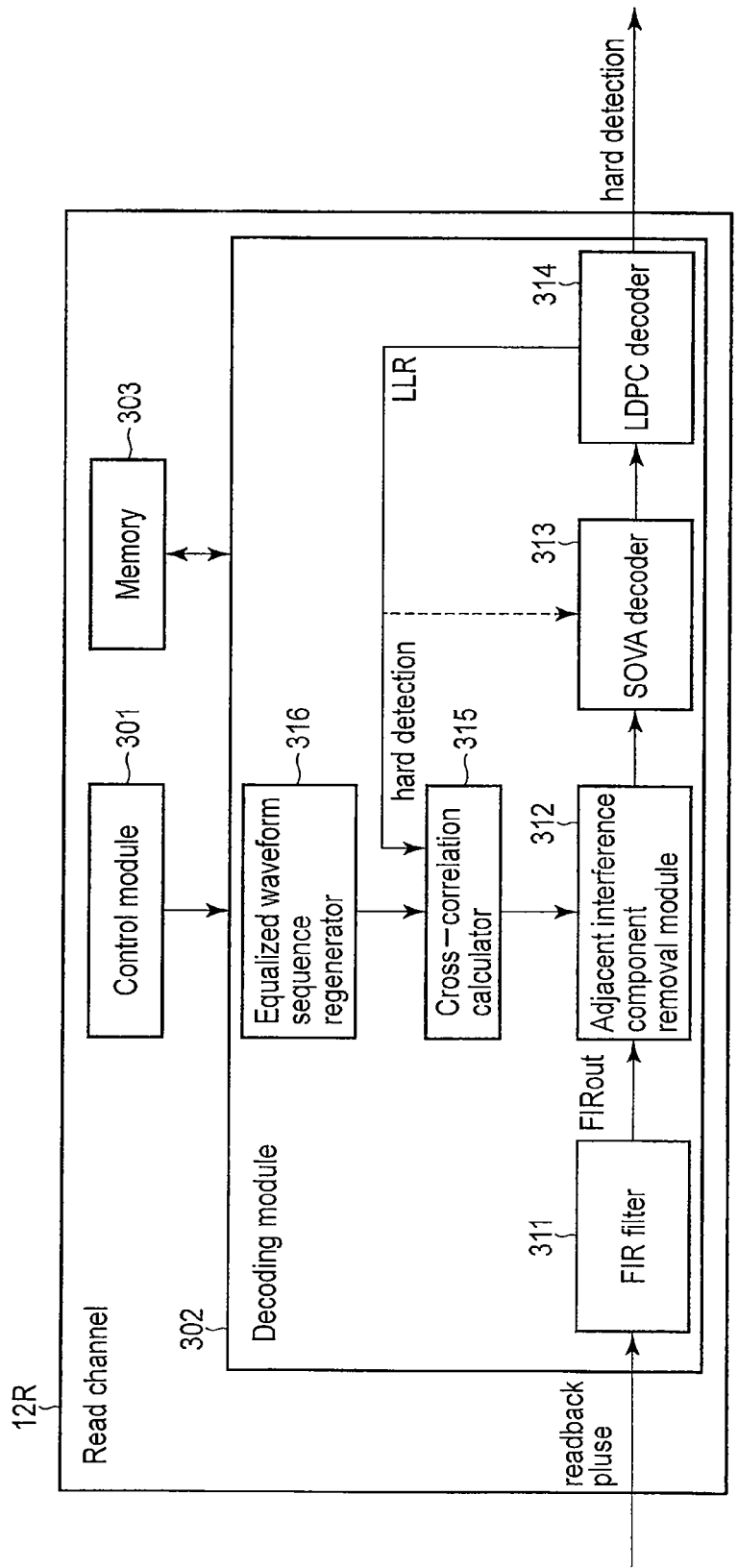
F I G. 3

INFORMATION REPRODUCING APPARATUS AND INFORMATION REPRODUCING METHOD FOR CANCELLING INTERFERENCE BETWEEN ADJACENT TRACKS

CROSS-REFERENCE TO RELATED APPLICATIONS

This application is based upon and claims the benefit of priority from Japanese Patent Application No. 2012-033314, filed Feb. 17, 2012, the entire contents of which are incorporated herein by reference.

FIELD

Embodiments described herein relate generally to an information reproducing apparatus and an information reproducing method for reproducing a signal recorded on a magnetic recording medium.

BACKGROUND

Hard disk drives, which record information on a magnetic disk and read the recorded information, have been broadly used.

A magnetic disk is provided with a plurality of data tracks, and information is recorded on each of the data tracks. In recent years, the pitch of adjacent data tracks has been narrow. Since the pitch has narrow, when a read head reads a signal recorded on a data track, there are cases where the read signal suffers interference of a signal recorded on a data track adjacent to the data track from which the signal has been read. In such a case, the signal recorded on the data track cannot be read accurately. In order to address this, removal of signal interference between adjacent tracks is performed, in which an interference component caused by the signal recorded on the data track adjacent to the data track has been read are removed from a read sample value sequence obtained by sampling the read signal.

In this technique, however, due to the low accuracy of the read sample value sequence, from which the interference component caused by the signal recorded on the data track adjacent to the data track has been read is removed, there are cases where decoding cannot be performed normally.

BRIEF DESCRIPTION OF THE DRAWINGS

FIG. 1 is an exemplary block diagram illustrating main components of a recorded information reproducing apparatus according to an embodiment.

FIG. 3 is an exemplary block diagram illustrating a configuration of a read channel for performing removal of signal interference between adjacent tracks according to a first method.

DETAILED DESCRIPTION

Figure 2:
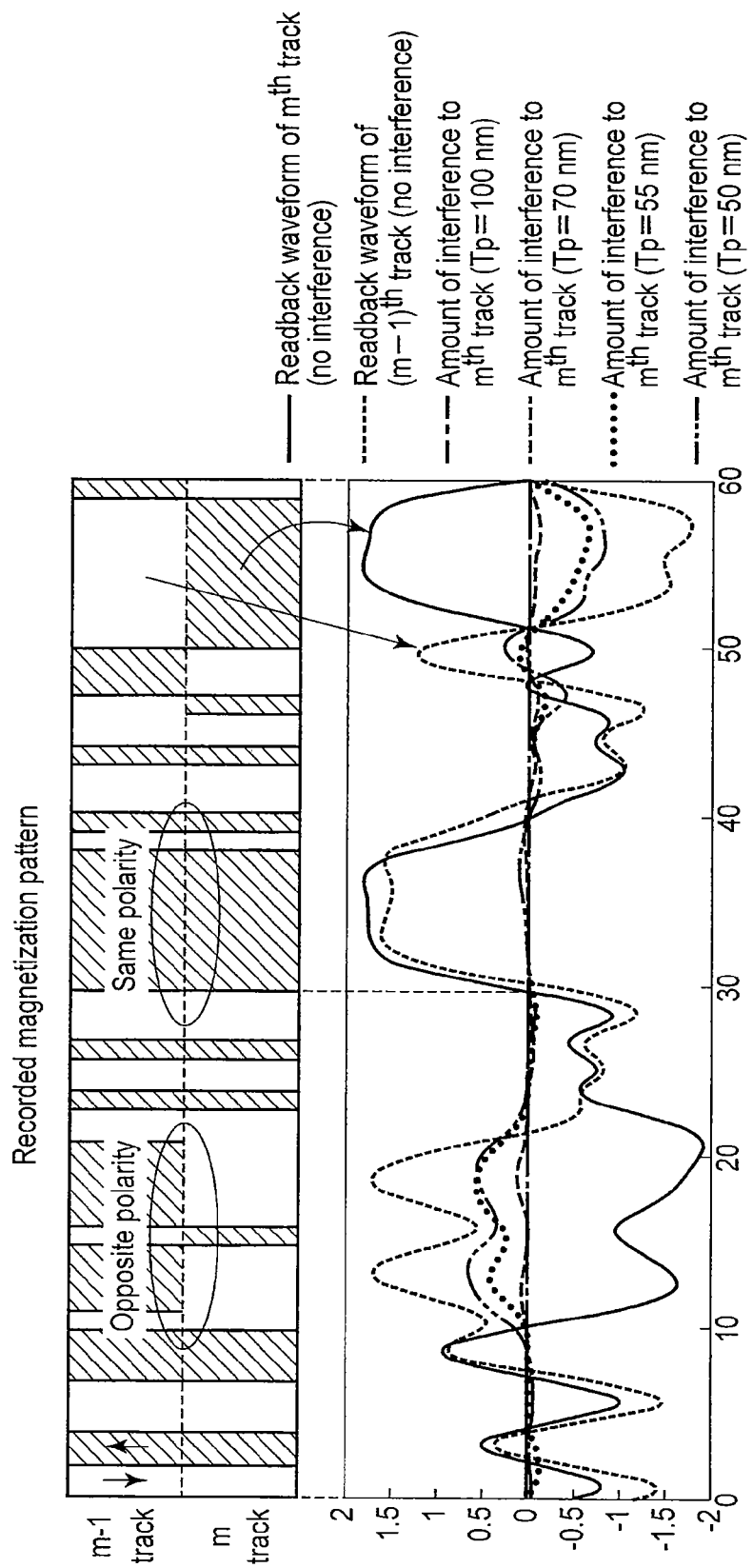
FIG. 2 is an exemplary diagram showing a state in which signal interference between adjacent tracks occurs.

In general, according to one embodiment, an information reproducing apparatus is configured to obtain, from a read sample value sequence obtained by sampling a read signal read from a first recording track of a magnetic recording medium, an interference-component-removed read sample value sequence, from which an interference component from a second recording track adjacent to the first recording track is removed. The apparatus includes a decoding module. The decoding module is configured to generate a first interference-component-removed read sample value sequence based on a cancellation weight column which varies according to a difference in polarity between a first bit of the first recording track and a second bit of the second recording track adjacent to the first bit.

Various embodiments will be described hereinafter with reference to the accompanying drawings.

FIG. 1 is a block diagram illustrating main components of a disk drive (recorded information reproducing apparatus) according to the embodiment.

As shown in FIG. 1, a disk drive is broadly formed of a head-disk assembly (HDA), a head amplifier integrated circuit (head amplifier IC) 11, and a hard disk controller (HDC) 15.

The HDA includes a disk 1 as a recording medium, a spindle motor (SPM) 2, an arm 3 provided with a head 10, and a voice coil motor (VCM) 4. The disk 1 is caused to rotate by the spindle motor 2. The arm 3 and the VCM 4 form an actuator. The actuator controls the head 10 mounted on the arm 3 to cause the head 10 to move to a specific position on the disk 1 by driving the VCM 4.

A plurality of data tracks (recording tracks) 200 are provided on the disk 1, in order to record information thereon.

The head 10 includes a slider as a main body and a write head 10W and a read head 10R mounted on the slider. The read head 10R reads data recorded on the data tracks on the disk 1. The write head 10R writes data onto the disk 1.

The head amplifier IC 11 includes a read amplifier and a write driver. The read amplifier amplifies a read signal read by the read head 10R, and transmits the amplified read signal to a read/write (R/W) channel 12. The write driver transmits a write current to the write head 10W according to the write data output from the R/W channel 12.

The HDC 15 is formed of a single-chip integrated circuit including the R/W channel 12, an interface controller 13, and a microprocessor (MPU) 14. The R/W channel 12 includes a read channel in which signal processing of read data is performed, and a write channel in which signal processing of write data is performed.

The interface controller 13 controls data transfer between a host system (which will also simply be referred to as a host) 20 and the R/W channel 12. The interface controller 13 performs data transfer control by controlling a buffer memory (DRAM) 16 and temporarily storing read data and write data in the buffer memory 16.

The MPU 14 is the main controller of the drive, and performs servo control, in which the VCM is controlled and the head 10 is positioned. As will be described later, the MPU 14 performs a disk error detection process and a flush process. The flush process is a write process in which data temporarily stored in a cache area is written (moved) into a user data area on the disk 1. The cache area is secured in a flush memory 17.

In recent years, the pitch of adjacent data tracks has been decreased. Since the pitch has decreased, when a read head reads data recorded on a data track, there are cases where the read signal suffers interference of a signal recorded on a data track adjacent to the data track from which the signal has been read. In such a case, the signal recorded on the data track cannot be read accurately.

A state in which signal interference occurs between adjacent tracks will be described with reference to FIG. 2. As shown in FIG. 2, an $(m-1)^{th}$ data track and an $m^{th}$ data track are adjacent to each other. The graph at the lower part of FIG. 2 shows a result obtained by computing reproducing waveforms of the $m^{th}$ data track and the $(m-1)^{th}$ data track in simulation when there is no signal interference between adjacent tracks. The graph at the lower part of FIG. 2 shows an amount of interference of a signal read from the $m^{th}$ data track in each of the cases where the pitch of the $m^{th}$ data track and the $(m-1)^{th}$ data track is 50, 55, 70, and 100 nm. The amount of interference is obtained by computing the reproducing waveform of the $m^{th}$ data track in simulation in each of the cases where the pitch is 50, 55, 70, and 100 nm, and indicates a difference between the reproducing waveform in each of the pitches and the reproducing waveform of the $m^{th}$ data track when there is no signal interference between adjacent tracks.

As shown in the graph of FIG. 2, the amount of interference increases as the pitch decreases. Considering the graph of FIG. 2, the amount of interference from an adjacent track is not constant and varies with the position. It is seen that interference becomes greater in a portion in which the polarity of a bit of the $m^{th}$ track and the polarity of a bit of the $(m-1)^{th}$ track adjacent to the bit of the $m^{th}$ track differ. It is also seen, on the other hand, that interference becomes little in a portion in which the polarity of a bit of the $m^{th}$ track and the polarity of a bit of the $(m-1)^{th}$ track adjacent to the bit of the $m^{th}$ track are the same.

This is because interference between a target track and an adjacent track is caused by deterioration of magnetic information of the target track due to a magnetic field that has leaked during recording on the adjacent track. When the polarities of adjacent bits are the same, since the directions of magnetization recorded on a medium are the same, magnetization of the target track will not be disturbed even when a leaked magnetic field is caused during recording on an adjacent track. When the polarities of adjacent bits are the opposite, however, since a leaked magnetic field opposite to the magnetization is applied to the target track, the magnetization of the target track is disturbed and interference of the reproducing waveform occurs. Accordingly, the amount of interference from an adjacent track varies according to the polarities of adjacent bits, as shown in FIG. 2.

The present apparatus is provided to prevent deterioration in the effect of removing signal interference between adjacent tracks even in a high-pitch region, e.g. even in the range in which 1 track=1 sector, by varying a cancellation weight a in increments of bits according to difference in polarity of between a bit of a target track and a bit of an adjacent track that are adjacent to each other.

First Method

In order to achieve the above-described reproducing system, a bit sequence of a target track needs to be estimated in some way. Since the target track is affected by signal interference of an adjacent track, however, an accurate bit sequence cannot be known. To address this, a decoding result obtained by performing removal of signal interference between adjacent tracks without considering difference in polarity between adjacent bits is returned to an equalizer as a provisional bit sequence of the target track. Thereby, difference in polarity between the adjacent bits is determined, and a cancellation weight a is varied in increments of bits.

FIG. 3 is a block diagram illustrating a configuration of the read channel 12R of the R/W channel 12 according to a first method of removing signal interference between adjacent tracks.

As shown in FIG. 3, the read channel 12R includes a control module 301, a decoding module 302, a memory 303, and the like. The decoding module 302 includes a finite impulse response (FIR) filter 311, an adjacent interference component removal module 312, a soft output Viterbi algorithm (SOVA) decoder (Viterbi decoder) 313, a low-density parity-check (LDPC) decoder 314, a cross-correlation calculator (setting module) 315, an equalized waveform sequence regenerator 316, and the like.

The FIR filter 311 samples a read signal read by the read head 10R and equalizes the waveform of the read signal to attain PR characteristics. The adjacent interference component removal module 312 generates an equalized waveform from which crosstalk from an adjacent track has been removed, from the equalized waveform. The SOVA decoder 313 performs decoding based on the soft output Viterbi algorithm (SOVA). The LDPC decoder 314 decodes a low-density parity-check code of a bit string output from the LDPC decoder 314. The cross-correlation calculator 315 generates a cancellation weight column used to generate an equalized waveform, from which crosstalk from an adjacent track is removed, from an equalized waveform, based on a bit string of a target track and a bit string of an adjacent track output from the LDPC decoder 314. The equalized waveform sequence regenerator 316 generates an equalized waveform based on the bit string of the adjacent track.

Figure 4:
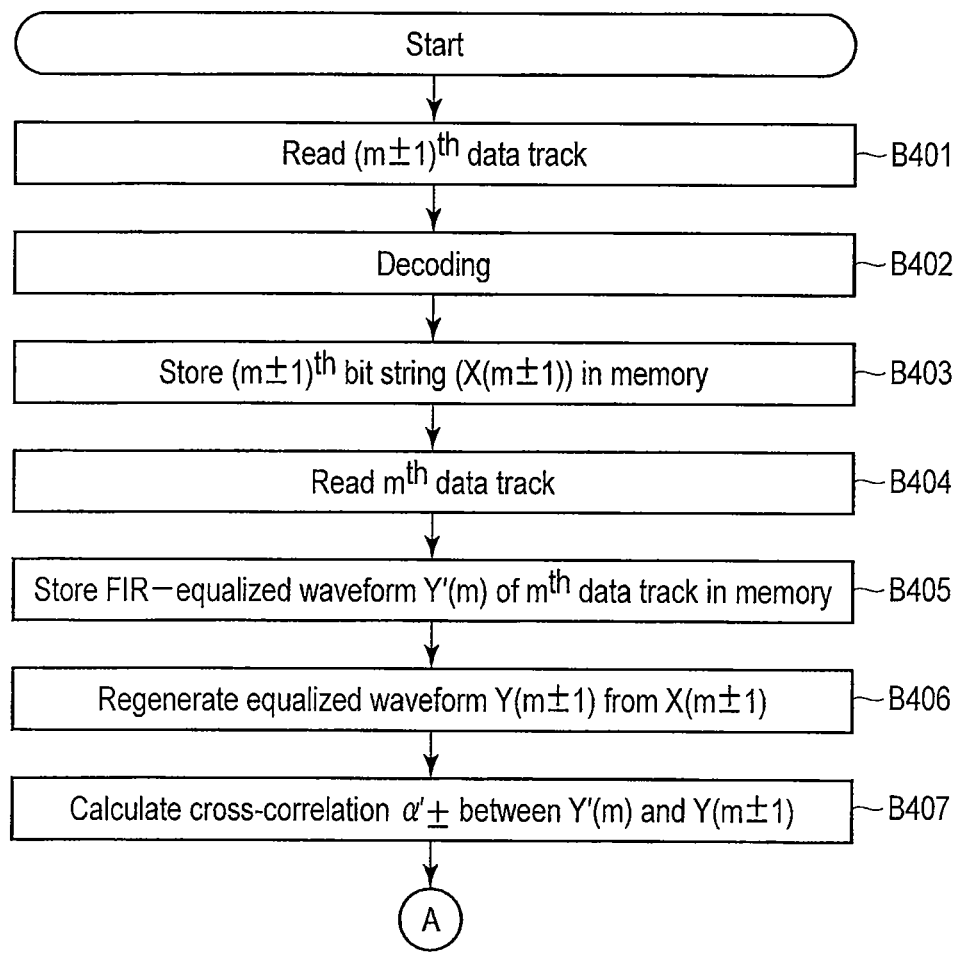
FIG. 4 is an exemplary flowchart illustrating for explaining the removal of signal interference between adjacent tracks according to the first method of the embodiment.
Figure 5:
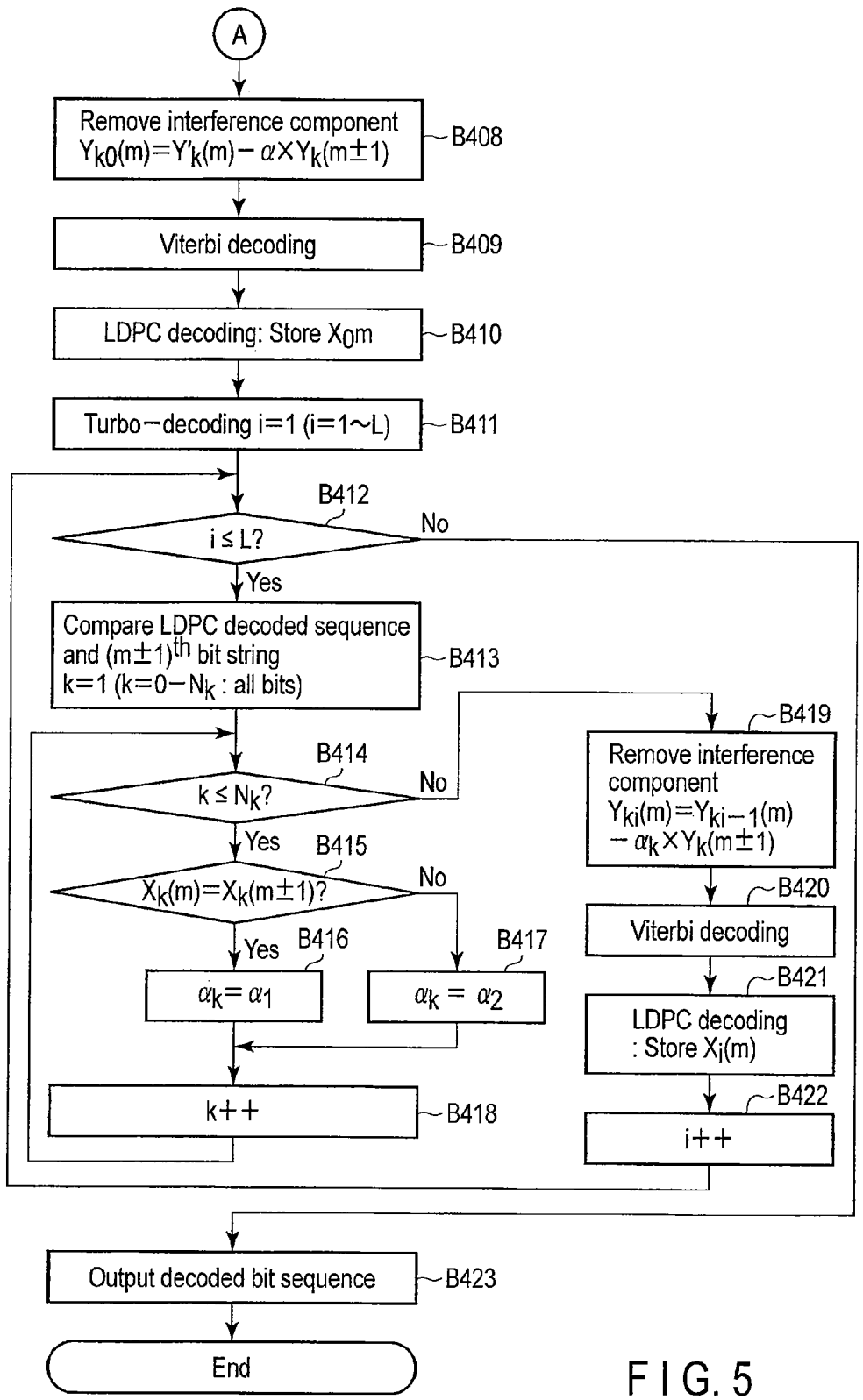
FIG. 5 is an exemplary flowchart illustrating for explaining the removal of signal interference between adjacent tracks according to the first method of the embodiment.

A detailed processing flow of the first method of removing signal interference between adjacent tracks will be described with reference to the flowcharts of FIGS. 4 and 5.

The read head 10R reads a signal recorded on an $(m\pm 1)^{th}$ data track, which is adjacent to an $m^{th}$ data track of the disk 1, from which a signal is to be played back (block B401). A decoding process is performed based on the read signal of the $(m\pm 1)^{th}$ data track (block B402). The decoding process of the $(m\pm 1)^{th}$ data track will be described later. A decoded bit sequencex(m±1) is stored in the memory 303 (block B403).

There are cases where a plurality of data tracks of the disk 1 are played back as a unit. In such a case, since a reproducing bit sequence of data on the $(m-1)^{th}$ data track is stored in the memory 303, the processes from block B401 to B403 do not need to be performed on the $(m-1)^{th}$ data track.

The read head 10R reads a signal recorded on the $m^{th}$ data track (block B404). The read signal is input to the FIR filter 311. The FIR filter 311 equalizes the waveform of the read signal to attain predetermined PR characteristics, and generates an equalized waveform sequence Y'(m). The FIR filter 311 stores the generated equalized waveform sequence Y'(m) in the memory 303 (block B405). The equalized waveform sequence regenerator 316 regenerates an equalized waveform sequence Y(m±1) based on the bit sequence x(m±1) of the (m±1)$^{th}$ data track stored in the memory 303 (block B406).

The cross-correlation calculator 315 calculates cross-correlation $\alpha'_{m\pm1}$ ($\alpha'_{m-1}$, $\alpha'_{m+1}$) between the equalized waveform sequence Y'(m) and equalized waveform sequences Y(m±1) (Y(m−1), Y(m+1)) (block B407). A cross-correlation coefficient $\alpha_{m-1}'$ between the equalized waveform sequence Y'(m) and the equalized waveform sequence Y(m−1) is determined by the formula shown below, which indicates a condition in which an adjacent component included in an equalized waveform sequence Y'$_{k(m)-a\times Yk}$(m−1) subjected to adjacent interference removal becomes minimum, $$\alpha'_{m-1} = \operatorname{argmin}_{a}\left[\left(\sum_{k}[Y_k(m) - aY_k(m-1)]\cdot Y_k(m-1)\right)\right]$$

where k denotes a label of a bit string in the equalized waveform sequence.

Similarly, a cross-correlation coefficient $\alpha'_{m+1}$ between the equalized waveform sequence Y'(m) and the equalized waveform sequence Y(m+1) is determined by the following formula:

$$\alpha'_{m+1} = \operatorname{argmin}_{a}\left[\left(\sum_{k}[Y_k(m) - aY_k(m+1)]\cdot Y_k(m+1)\right)\right]$$

The cross-correlation $\alpha_{m\pm1}$ is a coefficient obtained based on the premise that interference has occurred evenly, not depending on difference in polarity between adjacent bits.

The cross-correlation calculator 315 sets a cancellation weight $\alpha_{m\pm1}$ ($\alpha_{m-1}$, $\alpha_{m+1}$), which uniquely correlates with the cross-correlation $\alpha'_{m\pm1}$. For example, the cancellation weight $\alpha_{m\pm1}$ is determined so as to be proportional to the cross-correlation $\alpha'_{m\pm1}$. The adjacent interference component removal module 312 calculates an equalized waveform sequence Y$_0$(m), which is obtained by performing the first adjacent interference component removal on the equalized waveform sequence Y'(m) generated from a reproducing waveform of the m$^{th}$ data track, based on the set cancellation weight $\alpha_{m\pm1}$ (block B408).

The value Y$_{k0}$(m) of the k$^{th}$ bit in the equalized waveform sequence is obtained by the following formula:

$$Y_{k0}(m) = Y'_k(m) - \alpha a_{m-1} \times Y'_k(m-1) - \alpha_{m+1} \times Y'_k(m+1)$$

The SOVA decoder 313 performs Viterbi decoding on the equalized waveform sequence Y$_{k0}$(m) subjected to the first adjacent interference component removal (block B409). The LDPC decoder 314 performs LDPC decoding on the data decoded by the SOVA decoder 313, and generates a provisional bit sequence X(m) in the initial state (including an error) prior to turbo-decoding (0 time). The LDPC decoder 314 stores the generated bit sequence X(m) in the memory 303 (block B410).

In order to perform turbo-decoding on the provisional bit sequence X(m) L times, the control module 301 sets the value of i used to count the number of times of turbo-decoding to 1 (block B411). After that, the control module 301 determines whether the value of i is equal to or below L (block B412). When it is determined that the value of i is equal to or below L (Yes in block B412), the control module 301 transfers the provisional bit sequence X(m) and the adjacent track bit sequence X(m±1) stored in the memory 303 to the cross-correlation calculator 315. In order to perform comparison between the provisional bit sequence X(m) and the adjacent track bit sequence X(m−1), the cross-correlation calculator 315 sets the value of k indicating the comparison position to 1, where k denotes a positive integer ranging from 1 to N$_k$, and N$_k$ denotes the number of bit sequences.

The cross-correlation calculator 315 determines whether the value of k is equal to or below N$_k$ (block B414). When it is determined that the value of k is equal to or below N$_k$ (Yes in block B414), the cross-correlation calculator 315 determines whether the value X$_k$(m) of the k$^{th}$ bit of the provisional bit sequence X(m) and the value X$_k$(m−1) of the k$^{th}$ bit of the (m−1)$^{th}$ data track are equal (block B415). Further, a comparator determines whether the value X$_k$(m) of the k$^{th}$ bit of the provisional bit sequence X(m) and the bit value X$_k$(m+1) of the k$^{th}$ bit of the (m+1)$^{th}$ data track are equal.

When it is determined that the value X$_k$(m) of the k$^{th}$ bit of the provisional bit sequence X(m) and the value X$_k$(m−1) of k$^{th}$ bit of the (m−1)$^{th}$ data track are equal, the cross-correlation calculator 315 sets a cancellation weight $\alpha_{k-}$ of the value X$_k$(m−1) of the k$^{th}$ bit to $\alpha_1$ (block B416). When it is determined that the value X$_k$(m) of the k$^{th}$ bit of the provisional bit sequence X(m) and the value X$_k$(m−1) of the kth bit of the (m−1)$^{th}$ data track are not equal, the cancellation weight determination module sets the cancellation weight $\alpha_{k-}$ of the value X$_k$(m−1) of the k$^{th}$ bit to $\alpha_2$ (block B417).

When it is determined that the value X$_k$(m) of the k$^{th}$ bit of the provisional bit sequence X(m) and the value X$_k$(m+1) of the k$^{th}$ bit of the (m+1)$^{th}$ data track are equal, the cancellation weight determination module sets the cancellation weight $\alpha_{k+}$ of the value X$_k$(m+1) of the k$^{th}$ bit to $\alpha_1$ (block B416). When it is determined that the value X$_k$(m) of the kth bit of the provisional bit sequence X(m) and the value X$_k$(m+1) of the k$^{th}$ bit of the (m+1)$^{th}$ data track are not equal, the cancellation weight determination module sets the cancellation weight $\alpha_{k+}$ of the X$_k$(m±1) of the k$^{th}$ bit to $\alpha_2$ (block B417).

When $\alpha_{k-}$ and $\alpha_{k+}$ are determined, the cross-correlation calculator 315 sets a value obtained by adding 1 to the original value of k as a value of k (block B418). The cross-correlation calculator 315 determines whether the new value of k is equal to or below N$_k$ (block B414). When it is determined that the value of k is equal to or below N$_k$ (Yes in block B414), the cross-correlation calculator 315 sequentially executes the processes, starting from block B415. When it is determined that the value of k is not equal to or below N$_k$ (No in block B414), the cross-correlation calculator 315 transfers the determined $\alpha_{k-}$ and $\alpha_{k+}$ to the adjacent interference component removal module 312.

The adjacent interference component removal module 312 removes interference components based on the determined $\alpha_{k-}$ and $\alpha_k$ (block B419).

The k$^{th}$ value of the equalized waveform sequence Y$_{ki}$(m) is calculated by the formula shown below, based on an equalized waveform sequence Y$_{ki-1}$(m), from which an interference component is removed (i−1) times, and an equalized waveform sequence Y$_k$(m±1) of the (m±1)$^{th}$ data track.

$$Y_{k0}(l) = Y'_k(l) - \alpha_{l-1} \times Y'_k(l-1) - \alpha_{l+1} \times Y'_k(l+1)$$

The adjacent interference component removal module 312 stores an equalized waveform sequence Y$_{ki}$(m), from which interference components are removed i times, in the memory 303.

The control module 301 transfers the equalized waveform sequence $Y_{ki}(m)$ stored in the memory 303 to the SOVA decoder 313. The SOVA decoder 313 performs Viterbi decoding on the equalized waveform sequence $Y_{ki}(m)$, from which adjacent interference components are removed i times (block B420). The LDPC decoder 314 performs LDPC decoding on the data decoded by the Viterbi decoder and generates a provisional bit sequence $X_i(m)$. The LDPC decoder 314 stores the generated bit sequence $X_k(m)$ in the memory 303 (block B422).

The control module 301 sets a value obtained by adding 1 to the original value of i as a new value of i (block B422). The control module 301 determines whether the new value of i is equal to or below L (block B412). When the value of i is equal to or below L (Yes in block B412), the processes are sequentially executed, starting from block B413.

When it is determined that the value of i is not equal to or below L (No in block B412), the bit sequence $X_i(m)$ stored in the control module 301 and the memory 303 is output as a reproducing bit sequence (block B423).

Through the above-described processes, difference in polarity between adjacent bits is determined using a temporary decoding result, a cancellation weight is updated, and precision in removal of adjacent interference components is successively improved according to the loop of the turbo-decoding.

Figure 6:
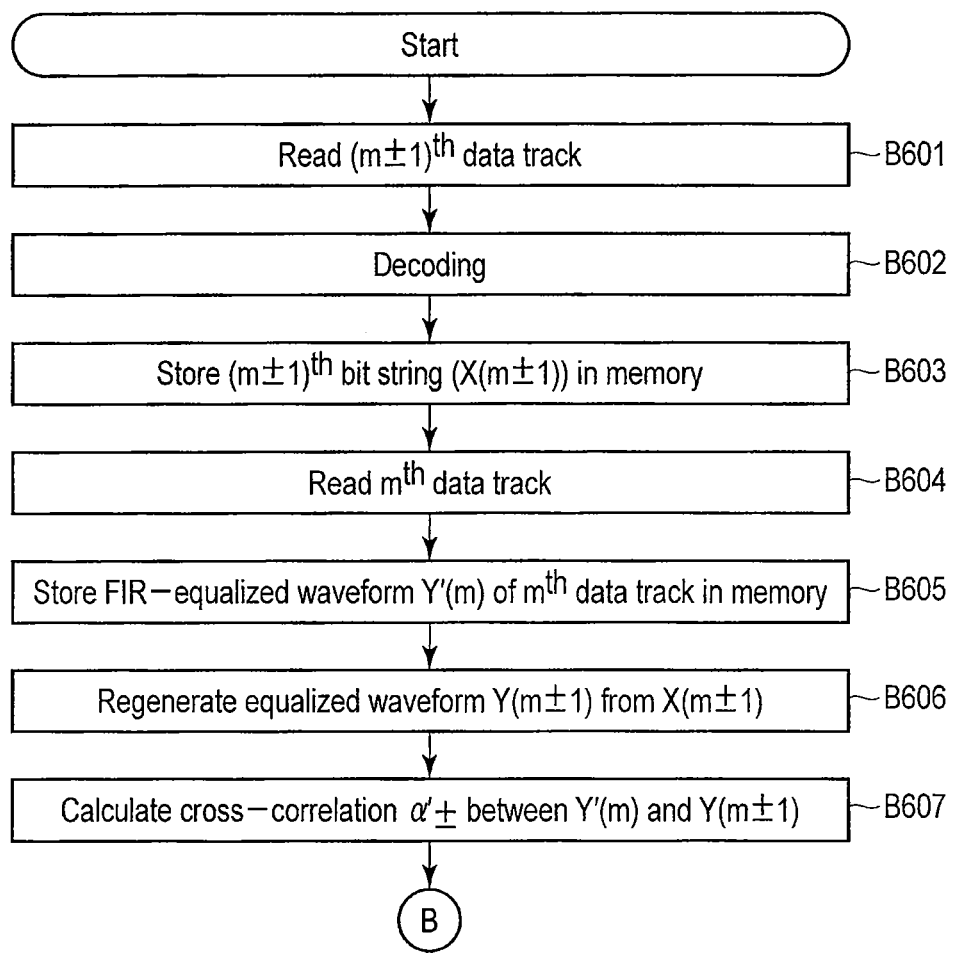
FIG. 6 is an exemplary flowchart illustrating for explaining the removal of signal interference between adjacent tracks according to the embodiment.
Figure 7:
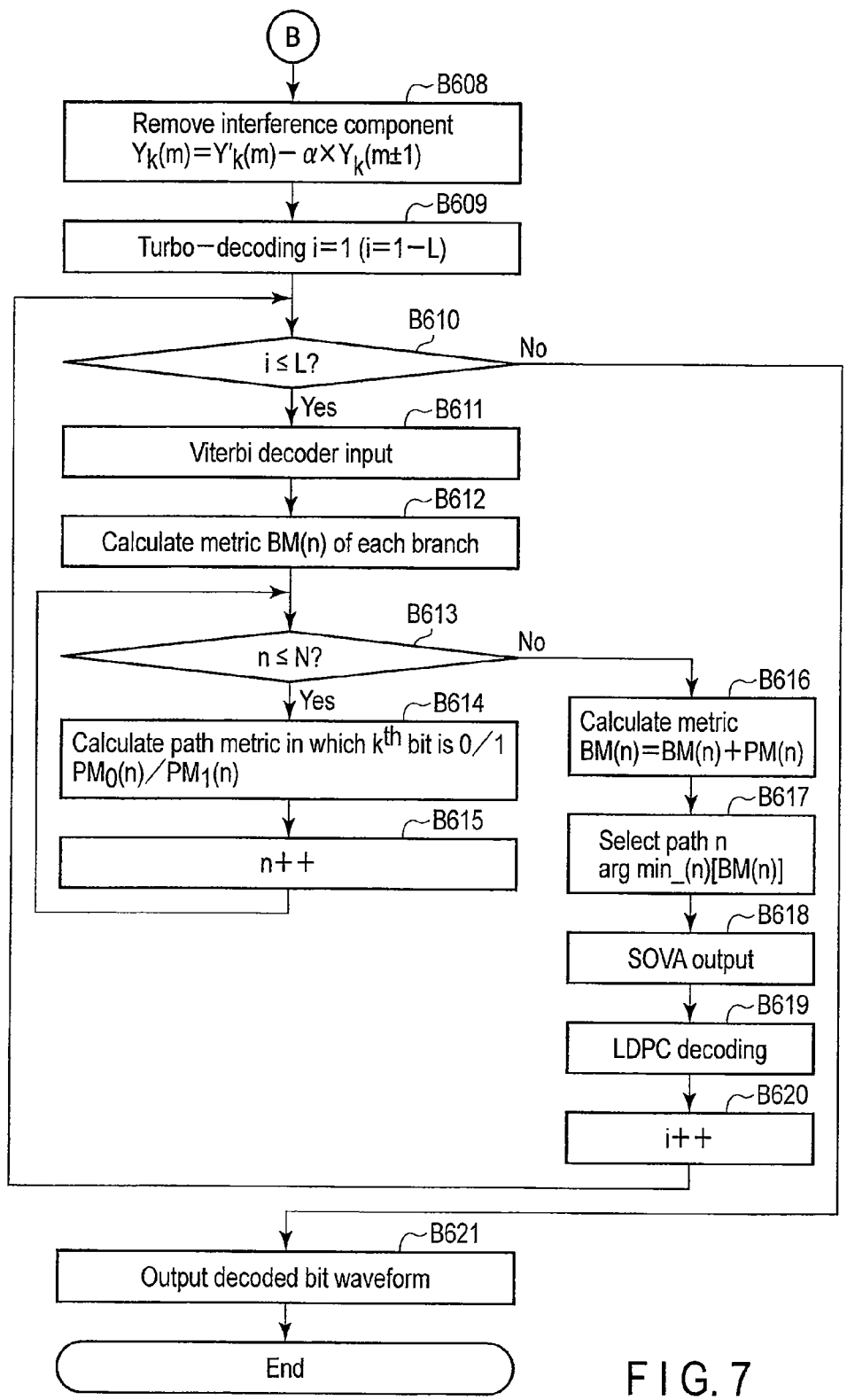
FIG. 7 is an exemplary flowchart illustrating for explaining the removal of signal interference between adjacent tracks according to the embodiment.

Next, decoding of the $(m\pm1)$th data track in block s B401 and B402 will be described with reference to the flowcharts of FIGS. 6 and 7. Hereinafter, decoding of the $(m-1)^{th}$ data track will be described. In the description that follows, assume that $l=m-1$.

Data recorded on the $(l\pm1)^{th}$ $((m-2)^{th}, m^{th})$ data track adjacent to the lth data track is read (block B601). A decoding process is performed based on the read data (block B602). The decoded bit sequence $X(l\pm1)$ is stored in the memory 303 (block B603).

The read head 10R reads data recorded on the lth data track (block B604). The read data is input to the FIR filter 311. The FIR filter 311 equalizes the waveform of the read data to attain predetermined PR characteristics, and generates an equalized waveform sequence $Y'_k(l)$. The generated equalized waveform sequence $Y'_k(l)$ is stored in the memory 303 (block B605). The equalized waveform sequence regenerator 316 regenerates an equalized waveform sequence $Y_k(l\pm1)$ based on the bit sequence $X(l\pm1)$ of the $(l\pm1)$th data track stored in the memory 303 (block B606).

The cross-correlation calculator 315 calculates cross-correlation $\alpha_{l+1}'$ ($\alpha_{l-1}'$, $\alpha_{l+1}'$) between the equalized waveform sequence $Y'_k(l)$ and the equalized waveform sequences $Y_k(l\pm1)$ ($Y_k(l-1), Y_k(l+1)$) (block B607). The cross-correlation coefficient $\alpha_{l-1}'$ is determined based on the formula shown below, which indicates a condition in which an adjacent component $a_{l-1}$ included in the sequence $Y'_k(l)-a_{l-1}\times Y_k(l-1)$ subjected to adjacent interference removal is performed becomes minimum.

$$\alpha'_{l-1} = \underset{a}{\operatorname{argmin}}\left[\left(\sum_k [Y_k(l) - aY_k(l-1)] \cdot Y_k(l-1)\right)\right]$$

The cross-correlation coefficient $\alpha_{l+1}'$ is determined by the formula shown below, which indicates a condition in which an adjacent component included in the sequence $Y'_k(l)-a_{l+1}\times Y_k(l+1)$ subjected to adjacent interference removal is performed becomes minimum.

$$\alpha'_{l+1} = \underset{a}{\operatorname{argmin}}\left[\left(\sum_k [Y_k(l) - aY_k(l+1)] \cdot Y_k(l+1)\right)\right]$$

The adjacent interference component removal module 312 sets a cancellation weight $\alpha_{l\pm1}$, which uniquely correlates with the cross-correlation $\alpha_{l\pm1}'$. The adjacent interference component removal module 312 calculates an equalized waveform sequence $Y_{k0}(l)$, which is obtained by performing the first adjacent interference component removal on the equalized waveform sequence $Y'_k(l)$ generated from a reproducing waveform of the lth track, based on the set cancellation weight $\alpha_{\pm1}$ (block B608).

$$Y_{k0}(l)=Y'_k(l)-\alpha_{l-1}\times Y'_k(l-1)-\alpha_{l+1}\times Y'_k(l+1)$$

In order to perform turbo-decoding on the provisional bit sequence $X(l)$ L times, the control module 301 sets the value of i used to count the number of times of turbo-decoding to 1 (block B609). After that, the control module 301 determines whether the value of i is equal to or below L (block B610). When it is determined that the value of i is equal to or below L (Yes in block B610), the control module 301 transfers the equalized waveform sequence $Y_{k1}(1)$ to the SOVA decoder 313. The SOVA decoder 313 calculates a branch metric $BM(n)$ of each branch (block B612). The SOVA decoder 313 determines whether the value of n is equal to or below N (block B613). When it is determined that the value of n is equal to or below N (Yes in block B613), the SOVA decoder 313 sets a path metric of a path leading to the $k^{th}$ bit, which is calculated for each state n of the $(k-1)^{th}$ bit of a trellis, to $PM(n)$. Assume that the path metric $PM(n)$ of a path leading to a state in which the $k^{th}$ bit is "0" is $PM_0(n)$, and the path metric $PM(n)$ of a path leading to a state in which the $k^{th}$ bit is "1" is $PM_1(n)$ (block B614). The SOVA decoder 313 sets a value obtained by adding 1 to the original value of n as a new value of n (block B615). The SOVA decoder 313 determines whether the value of n is equal to or below N (block B613). When it is determined that the value of n is equal to or below N (Yes in block B613), the SOVA decoder 313 sequentially performs the processes, starting from block B614.

When it is determined that the value of n is not equal to or below N (No in block B613), the SOVA decoder 313 calculates the branch metric $BM(n)$ using the calculated path metric $PM(n)$ (block B616). The SOVA decoder 313 performs selection of a bit sequence (path) based on the size of the metrics of the paths converging to the same state from the branch metric $BM(n)$ (block B617). After that, the SOVA decoder 313 transfers the selected bit sequence to the LDPC decoder 314 as a log-likelihood ratio (LLR) (block B618). The LDPC decoder 314 performs LDPC decoding using the transferred bit sequence (block B620). The LDPC decoder 314 stores the decoded bit sequence in the memory 303. The control module 301 sets a value obtained by adding 1 to the original value of i as a new value of i. The control module 301 determines whether the value of i is equal to or below L (block B610). When it is determined that the value of i is equal to or below L (Yes in block B610), the processes are sequentially executed, starting from block B611. When it is determined that the value of i is not equal to or below L (No in block B610), the control module 301 sets the input bit sequence as a reproducing sequence (block B621). Through the above-described approach, decoding of the $(m-1)^{th}$ data track is performed.

In this method, by determining difference in polarity between adjacent bits using a temporary decoding result and updating a cancellation weight, it is possible to sequentially improve precision in removal of signal interference components between the adjacent tracks according to the loop of turbo-decoding.

A standard decoder used in current hard disk drives adopts repetition decoding, in which an LDPC output is returned to an SOVA input in order to improve decoding performance, in addition to the configuration of the SOVA and the LDPC. The present method can be easily combined with such a configuration of a current decoder by using an LDPC output as a provisional bit sequence.

In order to determine the cancellation weights $\alpha_1$, $\alpha_2$ in cases where the adjacent bits have the same polarity and have opposite polarities, the following method can be taken, for example. Assuming that recording sequences are completely random, since the probability that adjacent bits have the same polarity and the probability that adjacent bits have the opposite polarities are both ½, it can be estimated that the cancellation weight in the case of the same polarity is $\alpha_1=0$ and the cancellation weight in the case of the opposite polarities is $\alpha_2=2\times\alpha'$. In actuality, since the amount of interference is not completely 0 in the case of the same polarity, it is also possible to perform optimizations using $\alpha_1$ and $\alpha_2$ as parameters.

Second Method

In the second method, instead of using a certain weight a to perform removal of signal interference between adjacent tracks, a bias term that corrects difference in polarity between adjacent bits is added at the time of Viterbi decoding, and thereby an effect same as that of the first method of removing signal interference between adjacent tracks is obtained. When the cancellation weight is constant, the interference removal is performed excessively in a portion in which the polarities of bits of a target track and an adjacent track are the same. When such a portion is decoded, the likelihood is expected to be low. In the present method, a bias term β is added to each branch metric at the time of convolutional decoding according to a bit sequence of the adjacent track, before decoding is performed based on the Viterbi algorithm, thereby obtaining an effect same as that obtained when α is varied in increments of bits.

Figure 8:
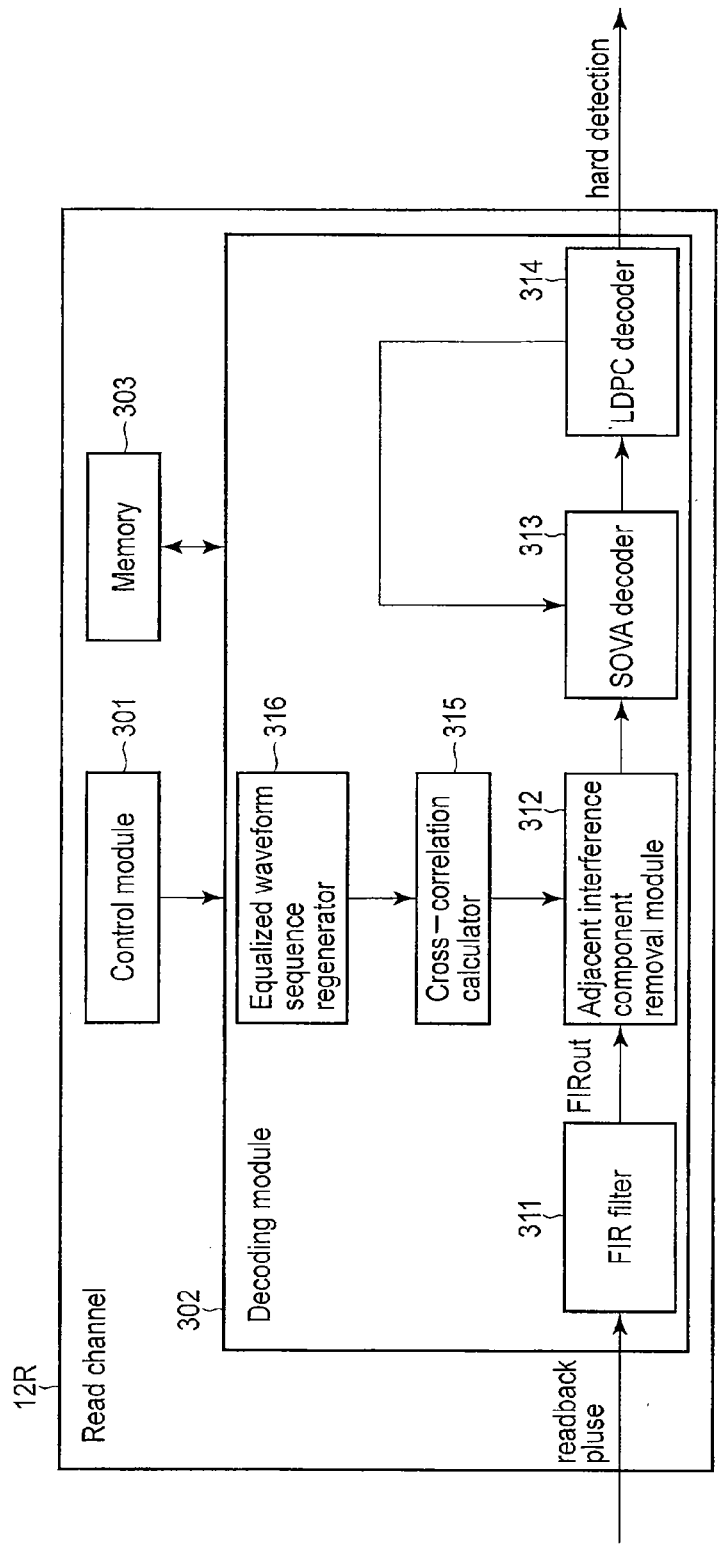
FIG. 8 is an exemplary block diagram illustrating a configuration of a read channel for performing removal of signal interference between adjacent tracks according to a second method.

FIG. 8 is a block diagram illustrating a configuration of a read channel 12R of a R/W channel 12 according to the second method of removing signal interference between adjacent tracks.

As shown in FIG. 8, the read channel 12R includes a control module 301, a decoder 302, a memory 303, and the like. The decoder 302 includes a FIR filter 311, an adjacent interference component removal module 312, an SOVA decoder (Viterbi decoder) 813, an LDPC decoder 314, a cross-correlation calculator (setting module) 315, an equalized waveform sequence regenerator 316, and the like.

The SOVA decoder 813 adds a bias term β to each branch metric according to a bit sequence of an adjacent track at the time of convolutional decoding when decoding is performed based on the Viterbi algorithm. Thereby, an effect same as that obtained when the cancellation weight α is varied in increments of bits.

Figure 9:
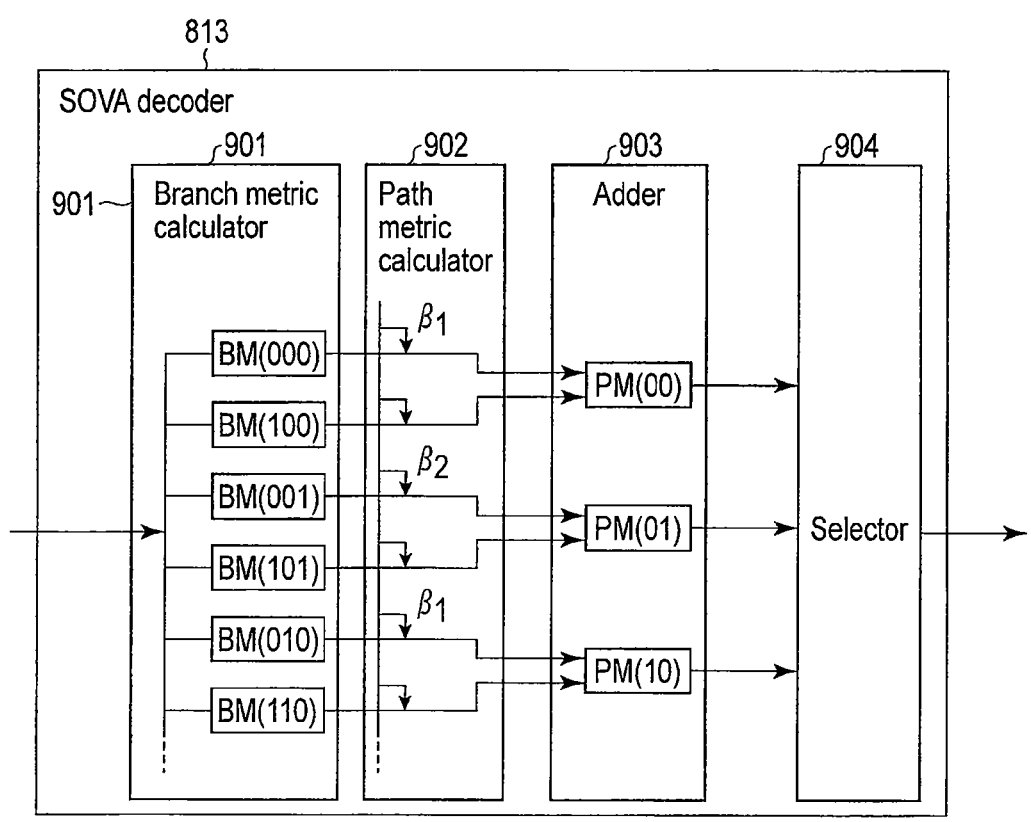
FIG. 9 is an exemplary block diagram illustrating a configuration of a SOVA decoder shown in FIG. 8.

Next, a configuration of the SOVA decoder 813 will be described with reference to FIG. 9.

The SOVA decoder 813 includes a branch metric calculator 901, a path metric calculator 902, an adder 903, a selector 904, and the like.

The branch metric calculator 901 performs calculation of branch metrics using data input from the FIR filter 311 or the LDPC decoder 314. The path metric calculator 902 calculates a path metric based on the branch metrics. The adder 903 performs addition of an output from the branch metric calculator and the path metric. The selector 904 selects one path metric from the path metrics output from the adder 903.

Figure 10:
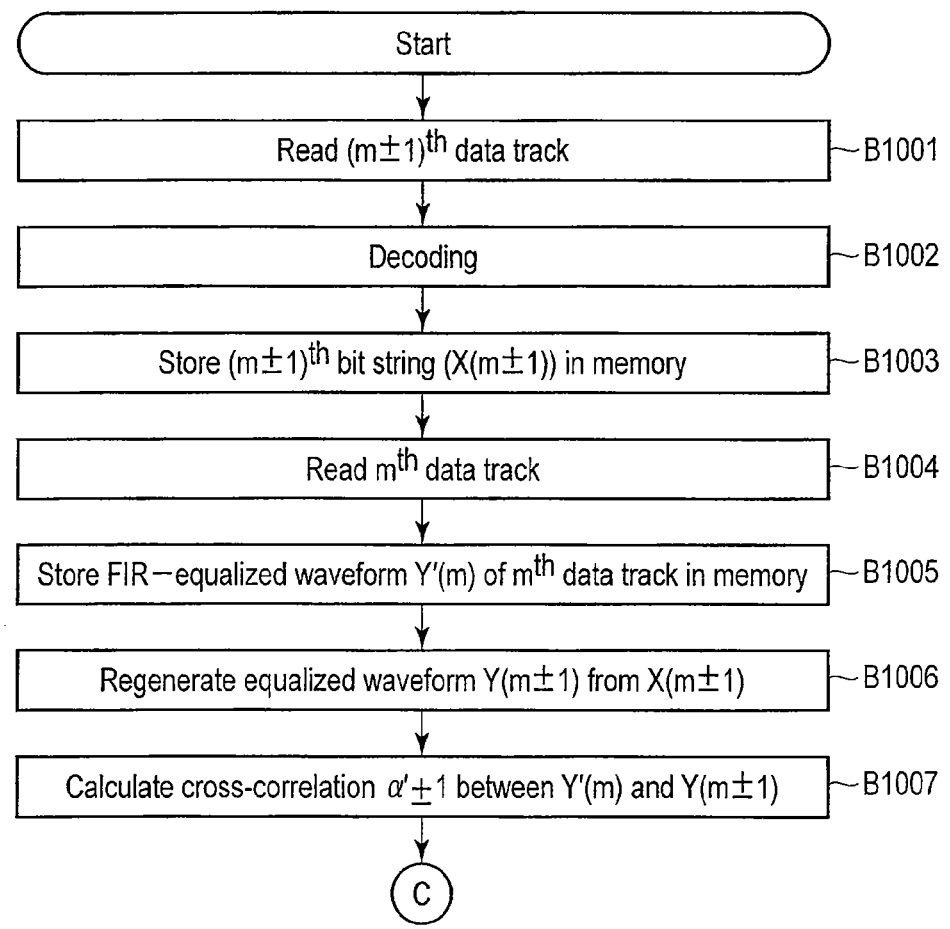
FIG. 10 is an exemplary flowchart illustrating for explaining the removal of signal interference between adjacent tracks according to the second method of the embodiment.
Figure 11:
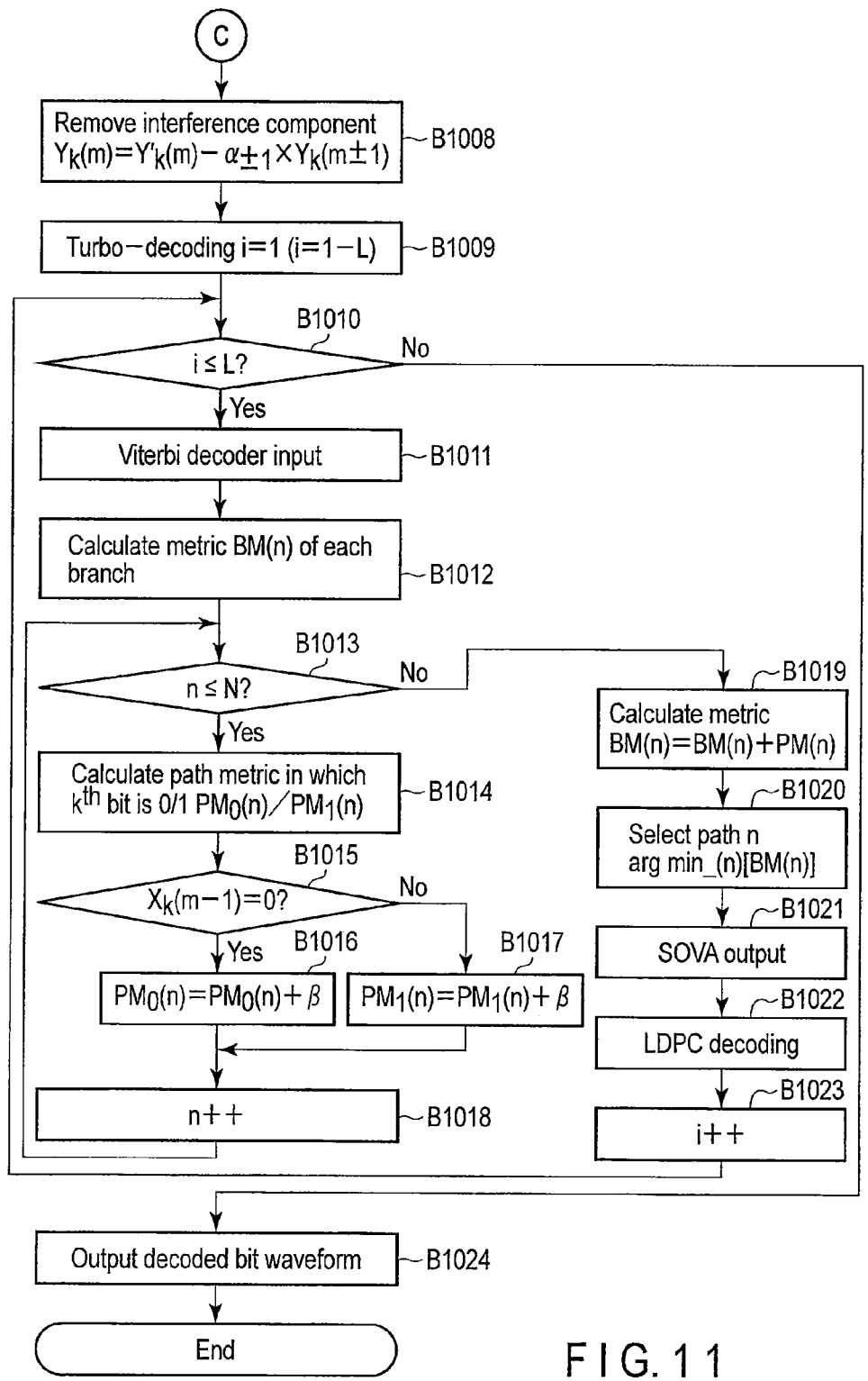
FIG. 11 is an exemplary flowchart illustrating for explaining the removal of signal interference between adjacent tracks according to the second method of the embodiment.

A detailed processing flow according to the first method of removing signal interference between adjacent tracks will be described with reference to FIGS. 10 and 11.

Data recorded on the $(m\pm1)^{th}$ data track adjacent to the $m^{th}$ data track is read (block B1001). A decoding process is performed based on the read data (block B1002). The decoding process on the $(m\pm1)^{th}$ data track will be described later. A decoded bit sequence $X(m\pm1)$ is stored in the memory 303 (block B1003).

A read head 10R reads data recorded on the $m^{th}$ data track (block B1004). The read data is input to the FIR filter 311. The FIR filter 311 equalizes the waveform of the read data to attain predetermined PR characteristics, and generates an equalized waveform sequence Y'(m). The FIR filter 311 stores the generated equalized waveform sequence Y'(m) in the memory 303 (block B1005). The equalized waveform sequence regenerator 316 regenerates an equalized waveform sequence $Y(m\pm1)$ based on the bit sequence $X(m\pm1)$ of the $(m\pm1)^{th}$ data track stored in the memory 303 (block B1006).

The cross-correlation calculator 315 calculates cross-correlation $\alpha'_{m\pm1}$ ($\alpha'_{m-1}$, $\alpha'_{m+1}$) between the equalized waveform sequence Y'(m) and the equalized waveform sequence $Y(m\pm1)$ $(Y(m-1), Y(m+1))$ (block B1007). The cross-correlation coefficient $\alpha_{m-1}'$ between the equalized waveform sequence Y'(m) and the equalized waveform sequence Y(m-1) is determined by the formula shown below, which indicates a condition in which an adjacent component included in the equalized waveform sequence $Y'_k(m)-a\times Y_k(m-1)$ subjected to adjacent interference removal becomes minimum, $$\alpha'_{m-1} = \underset{a}{\operatorname{argmin}}\left[\left(\sum_k [Y_k(m) - aY_k(m-1)] \cdot Y_k(m-1)\right)\right]$$

where k is a label of a bit string in the equalized waveform sequence.

Similarly, the cross-correlation coefficient $\alpha_{m+1}$ between the equalized waveform sequence Y'(m) and the equalized waveform sequence Y(m+1) is obtained by the following formula:

$$\alpha'_{m+1} = \underset{a}{\operatorname{argmin}}\left[\left(\sum_k [Y_k(m) - aY_k(m+1)] \cdot Y_k(m+1)\right)\right]$$

The cross-correlation $\alpha'_{m\pm1}$ is a coefficient obtained based on the premise that interference occurs evenly, not depending on difference in polarity between adjacent bits.

The cross-correlation calculator 315 sets a cancellation weight $\alpha_{m\pm1}$ ($\alpha_{m-1}$, $\alpha_{m+1}$), which uniquely correlates with the cross-correlation $\alpha'_{m\pm1}$. The adjacent interference component removal module 312 calculates an equalized waveform sequence $Y_0(m)$ obtained by performing the first adjacent interference component removal on the equalized waveform sequence Y'(m) generated from a reproducing waveform of the m$^{th}$ track, based on the set cancellation weight $\alpha_{m+1}$ (block B1008).

The value $Y_{k0}(m)$ of the k$^{th}$ bit in the equalized waveform sequence is obtained by the following formula:

$$Y_{k0}(m)=Y'_k(m)-\alpha \times Y'_k(m-1)$$

In order to perform turbo-decoding L times, the control module 301 sets the value of i used to count the number of times of turbo-decoding to 1 (block B1009). After that, the control module 301 determines whether the value of i is equal to or below L (block B1010). When it is determined that the value of i is equal to or below L (Yes in block B1010), the control module 301 transfers the equalized waveform sequence to the SOVA decoder 813 (block B1011).

The branch metric calculator 901 of the SOVA decoder 813 calculates a branch metric BM(n) of each branch (block B1012). The SOVA decoder 813 determines whether the value of n is equal to or below N (block B1013). When it is determined that the value of n is equal to or below N (Yes in block B1113), the path metric calculator 902 sets a path metric of a path leading to the k$^{th}$ bit, which is calculated for each state n of the (k−1)$^{th}$ bit of a trellis, to PM(n). The path metric calculator 902 sets the path metric PM(n) of a path leading to a state in which the k$^{th}$ bit is "0" is PM$_0$(n), and the path metric PM(n) of a path leading to a state in which the k$^{th}$ bit is "1" is PM$_1$(n) (block B1014).

The path metric calculator 902 refers to an adjacent bit sequence X$_k$(m−1) at the time of calculating the path metric PM(n) (block B1015). When X$_k$(m−1)=0, the path metric calculator 902 sets PM0(n) such that PM$_0$(n)=PM$_0$(n)+β (block B1016). When X$_k$(m−1)=0 is not satisfied, the path metric calculator 902 adds a bias term β to the metric corresponding to the path having the same polarity as the adjacent bit, as expressed as follows: PM$_1$(n) PM$_1$(n)+β.

The adder 903 calculates a branch metric BM(n) using thus obtained PM(n) (block B1019). The selector 904 performs selection of a path metric based on the size of the metric of each of the paths converging to the same state (block B1020). The SOVA decoder 813 passes the selected path metric to the LDPC decoder 314 as a log-likelihood ratio (LLR) (block B1021).

The LDPC decoder 314 performs LDPC decoding using the transferred bit sequence (block B1022). The control module 301 sets a value obtained by adding 1 to the original value of i as a new value of i. The control module 301 determines whether the value of i is equal to or below L (block B1010). When it is determined that the value of i is equal to or below L (Yes in block B1010), the processes are sequentially executed, starting from block B1011. When it is determined that the value of i is not equal to or below L (No in block B1010), the control module 301 sets the input bit sequence as a reproducing sequence (block B1010). Through the above-described approach, decoding of the m$^{th}$ data track is performed.

Through the above-described processes, information on precision of interference removal is added to a metric, and the probability that errors are corrected in Viterbi convolutional decoding and the subsequent LDPC decoding can be increased. According to the present method, since bias processing is performed on all the branches that can occur in a state in which a target track sequence is indefinite, a decoding process can be performed considering difference in polarity even if a bit sequence of the target track is completely unknown, compared to the first method.

Since the likelihood of the paths having the same polarity decreases as the amount of interference increases, the bias term β is determined in proportion to the cancellation weight α. Since it is difficult to quantitatively estimate the bias term β, however, the bias term β should desirably be optimized as a parameter based on an error rate with respect to each Tp condition.

Even when there is interference from both of the adjacent tracks ((m±1)$^{th}$ tracks), extension can be easily made by performing similar calculations on the (m+1)$^{th}$ track and the m$^{th}$ track according to the second method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information reproducing apparatus for obtaining, from a read sample value sequence obtained by sampling a read signal read from a first recording track of a magnetic recording medium, an interference-component-removed read sample value sequence of the first recording track, from which an interference component from a second recording track adjacent to the first recording track is removed, the apparatus comprising:
a decoding unit configured to generate an interference-component-removed read sample value sequence of the first recording track based on a cancellation weight sequence that varies according to a difference in polarity between a first bit of the first recording track and a second bit of the second recording track, wherein the second bit is adjacent to the first bit.

2. The apparatus of claim 1, wherein the decoding unit comprises:
a decoder configured to generate a first bit string by decoding the read sample value sequence;
a setting unit module configured to determine whether a value of a third bit in the first bit string corresponding to the first recording track is equal to a value of a fourth bit in a second bit string corresponding to the second recording track, wherein the fourth bit is adjacent to the third bit, and to set a cancellation weight corresponding to the third bit in the cancellation weight sequence based on a result of the determination; and
an interference component removal unit configured to generate the interference-component-removed read sample value sequence of the first recording track based on the read sample value sequence, an interference-component-removed read sample value sequence of the second recording track, and the cancellation weight sequence,
wherein the setting unit is further configured to reset the cancellation weight sequence based on the interference-component-removed read sample value sequences of the first and second recording tracks,
wherein the interference component removal unit is further configured to generate the first interference-component-removed read sample value sequence of the first recording track based on the reset cancellation weight sequence.

3. The apparatus of claim 2, wherein the decoder further comprises:
a Viterbi decoder configured to decode the first read sample value sequence based on a Viterbi algorithm, and an LDPC decoder configured to decode with a low-density parity-check code of bit strings decoded by the Viterbi decoder.

4. The apparatus of claim 2, wherein the setting unit is configured to set the cancellation weight corresponding to the third bit in the cancellation weight sequence to zero upon determining that the value of the third bit and the value of the fourth bit are equal.

5. The apparatus of claim 2, further comprising:
a generator configured to generate the interference-component-removed read sample value sequence of the second recording track by removing an interference component from the second recording track from the interference-component-removed read sample value sequence of the first recording track, based on a cancellation weight sequence without considering difference in polarity between the third bit and the fourth bit,
wherein the interference-component-removed read sample value sequence of the second recording track is used as the read sample value sequence when the interference component removal unit initially generates the interference-component-removed read sample value sequence of the first recording track.

6. The apparatus of claim 1, wherein the decoder comprises a Viterbi decoder configured to decode based on a Viterbi algorithm by adding a bias term corresponding to a difference in polarity between the value of the first bit and the value of the second bit to a path metric corresponding to the first bit in each branch metric.

7. An information reproducing method for obtaining, from a read sample value sequence obtained by sampling a read signal read from a first recording track of a magnetic recording medium, an interference-component-removed read sample value sequence of the first recording track, from which an interference component from a second recording track adjacent to the first recording track is removed, the method comprising:
generating an interference-component-removed read sample value sequence of the first recording track based on a cancellation weight sequence that varies according to a difference in polarity between a first bit of the first recording track and a second bit of the second recording track, wherein the second bit is adjacent to the first bit.

8. The method of claim 7, wherein generating the interference-component-removed read sample value sequence of the first recording track comprises:
generating a first bit string by decoding the read sample value sequence;
determining whether a value of a third bit in the first bit string corresponding to the first recording track and a value of a fourth bit in a second bit string corresponding to the second recording track are equal, wherein the fourth bit is adjacent to the third bit;
setting a cancellation weight corresponding to the third bit in the cancellation weight sequence based on a result of the determination; and
generating the interference-component-removed read sample value sequence of the first recording track based on the read sample value sequence, an interference-component-removed read sample value sequence of the second recording track, and the cancellation weight sequence;
resetting the cancellation weight sequence based on the interference-component-removed read sample value sequences of the first and second recording tracks and
generating the interference-component-removed read sample value sequence of the first recording track based on the reset cancellation weight sequence.

9. The method of claim 7, wherein the read sample value sequence is decoded based on a Viterbi algorithm by adding a bias term corresponding to a difference in polarity between the value of the first bit and the value of the second bit to a path metric corresponding to the first bit in each branch metric.

* * * * *